United States Patent [19]

Andress et al.

[11] Patent Number: 4,895,579

[45] Date of Patent: Jan. 23, 1990

[54] REACTION PRODUCTS OF ALKENYLSUCCINIC COMPOUNDS WITH AROMATIC AMINES AND HINDERED ALCOHOLS AND LUBRICANT AND FUEL COMPOSITIONS THEREOF

[75] Inventors: Harry J. Andress, Wenonoah; Henry Ashjian, E. Brunswick, both of N.J.

[73] Assignee: Mobil Oil Corporation, New York, N.Y.

[21] Appl. No.: 297,150

[22] Filed: Jan. 17, 1989

Related U.S. Application Data

[62] Division of Ser. No. 702,989, Feb. 19, 1985, Pat. No. 4,803,004.

[51] Int. Cl.$^4$ .......................... C10L 1/22; C10L 1/18
[52] U.S. Cl. ........................................... 44/75; 44/53; 44/56
[58] Field of Search ................................ 44/53, 56, 75

[56] References Cited

U.S. PATENT DOCUMENTS

| | | | |
|---|---|---|---|
| 2,783,206 | 2/1957 | Messina | 252/51.5 |
| 3,576,743 | 4/1971 | Widmer et al. | 252/51.5 |
| 3,950,341 | 4/1976 | Okamoto et al. | 252/51.5 A |
| 3,991,056 | 11/1976 | Okamoto et al. | 260/268 |
| 4,083,699 | 4/1978 | Chibnik | 44/75 |
| 4,522,736 | 6/1985 | Andress et al. | 252/51.5 A |

FOREIGN PATENT DOCUMENTS 2017108 10/1979 United Kingdom .

*Primary Examiner*—William R. Dixon, Jr.
*Assistant Examiner*—Maria Reardon Nguyen
*Attorney, Agent, or Firm*—Alexander J. McKillop; Charles J. Speciale; Howard M. Flournoy

[57] ABSTRACT

Products made by reacting an alkenylsuccinic compound with an arylamine and a hindered alcohol provide superior dispersant and antioxidant activity to lubricant compositions when incorporated therein.

12 Claims, No Drawings

REACTION PRODUCTS OF ALKENYLSUCCINIC COMPOUNDS WITH AROMATIC AMINES AND HINDERED ALCOHOLS AND LUBRICANT AND FUEL COMPOSITIONS THEREOF

This is a division of Ser. No. 702,989, filed 2/19/85, now U.S. Pat. No. 4,803,004.

BACKGROUND OF THE INVENTION

The invention relates to additives useful in lubricant compositions. More particularly the additives comprise reaction products of alkenylsuccinic compounds with arylamines and hindered alcohols to provide products having superior dispersant and antioxidant activity.

It is known that in the normal use of organic lubricant oils such as transmission fluids, bearing lubricants, power transmitting fluids and diesel engine lubricants, the base medium is subjected to oxidizing conditions which may result in the formation of sludge, lacquers, corrosive acids and the like. These products are undesirable since they leave oxidation residues or other solid contaminants which interfere with the normal operation of the fluid, increase its viscosity and even cause severe damage to parts of the equipment itself.

In the lubrication of modern engines, e.g., gasoline, oil compositions must be able to prevent acids, sludge and other solid contaminants from maintaining contact with moving metal parts. Poor piston travel and excessive engine bearing corrosion may result unless the oil can prevent sludge and oxidation products from depositing in the engines. Superior dispersants are therefore particularly needed in new engine oils.

The most desirable way for decreasing these difficulties is to add to the base lubricant fluid an additive capable of dispersing solid particles to prevent them from interferring with the normal operation of the equipment and capable of leaving the metal surfaces relatively clean. Today with modern equipment operating under increasingly strenuous conditions, it is highly desirable to develop new detergents which have improved dispersant properties, which are soluble in the fluid lubricants to which they are added and which are themselves stable therein.

U.S. Pat. No. 3,862,981 discloses the catalytic reaction of a polyalkylene succinic acid anhydride with diphenylolpropane and tetraethylenepentamine, pyridine or triethylenetetramine.

U.S. Pat. No. 4,292,186 discloses lubricant compositions containing the reaction product of an alcohol or an amino alcohol with a succinic compound and metal salt.

U.S. Pat. No. 4,086,173 discloses the reaction product of an alkenylsuccinic anhydride and an alkylene polyamine or a glycol ester or a bis-alkylsuccinicimide.

U.S. Pat. No. 4,083,699 relates to polyethylene polyamine Mannich base products and their use in lubricants and fuels prepared by reacting a high molecular weight alkyl substituted hydroxy aromatic compound, a polyoxyethylene polyamine and an aldehyde.

U.S. Pat. No. 4,466,895 discloses the use of the reaction product of, a succinic anhydride, ethylene polyamine and pentaerythritol in lubricants.

U.S. Pat. No. 4,219,431 is directed to lubricant compositions containing a lubricant and a minor amount of a derivative of alkenylsuccinic anhydride which includes the reaction product of (1) an alkenylsuccinic acid, ester or anhydride and a hydroxy aromatic compound and (2) the product of reaction between (1) and an amine, (3) the reaction product of (2) and and aldehyde and (4) the reaction product of (3) and a metal salt. To the best of applicants' knowledge and belief the reaction products disclosed herein are new and accordingly it is believed that no one has heretofore used the reaction product of an alkenylsuccinic compounds, e.g., anhydride, an arylamine and a hindered alcohol to provide products having superior dispersant/antioxidant characteristics for lubricant compositions.

SUMMARY OF THE INVENTION

In accordance with the invention, there are provided (1) a product made by reacting (a) a polyalkenylsuccinic compound with (b) an aromatic amine and (c) a hindered alcohol, and (2) a lubricant composition comprising a major amount of a lubricant and a minor dispersant/antioxidant amount of the described reaction product. The product may also be used in liquid hydrocarbon fuels.

DESCRIPTION OF SPECIFIC EMBODIMENTS

The alkenylsuccinic compound which includes alkenylsuccinic acid, ester or anhydride thereof is one wherein the alkenyl group is a hydrocarbon containing a double bond and containing from 25 to about 300 carbon atoms. These are produced by known techniques from an olefin or polyolefin and maleic anhydride such as the catalytic oligomerization of an olefin containing 2 to about 10 carbon atoms; the oligomer so produced can then be reacted with maleic anhydride by well known methods (as by $BF_3$ catalysis) to give the alkenylsuccinic compound. The olefin may be a simple alkene, such as 1-octene, 1-decene, 1-dodecene, and so forth, or it may be a polymer or copolymer of such olefins as ethene, propene, 1-butene, isobutene, 1-hexene, 1-octene and so forth.

The alkenylsuccinic esters include the mono and diesters and may be represented by the formula:

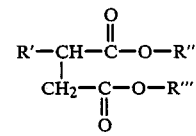

wherein R' is the alkenyl group defined hereinabove and R" and R'" are hydrogen or a hydrocarbyl group having from 1 to 22 carbon atoms. Preferably the group is an alkyl having 1 to 18 carbon atoms. For example, R" and R'" may be methyl, ethyl, butyl, octyl, dodecyl, octadecyl, eicosyl, and the like. They may also be hydrogen. While both R' and R" may be a hydrocarbyl group, either the same or different, only one of them may be hydrogen. In other words, at least one of R" and R'" must be a hydrocarbyl group.

The aromatic amine has the following general formulae

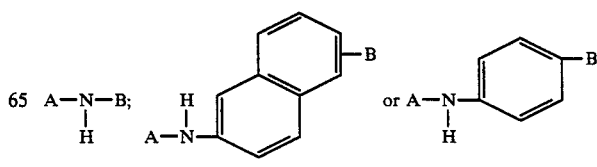

wherein A and B are each an aromatic or aryl group which may be the same or different, and which may contain an alkyl substituent having about 4–18 carbon atoms; each aryl group (A and B) separately may be a benzene or naphthalene nucleus, containing substituents in addition to the alkyl groups. A and/or B may for example be a naphthalene residue such as an alpha or beta naphthyl group. The aromatic or aryl groups generally will have from 6 to about 50 carbon atoms. In addition to being alkyl substituent groups may also be aralkyl, or alkoxy or an acyloxy group. However, preferably the substituent will be selected from among tertiary octyl, t-dodecyl, di-t-dodecyl, t-butyl and di-t-butyl.

Examples of aromatic amines include mono-tertiaryalkyldiarylamines, di-tertiaryoctyl-diphenylamine, dialkyldiarylamines, diphenylamine, 4-tertiarypentyl-diphenylamine, N-p-tertiary pentyl-phenyl-alpha-naphthylamine, beta-4-tertiaryoctyl-phenyl-alpha napthylamine, N-p-(1:1:3:3:-tertramethylbutyl) alpha-naphthylamine, 4-p-(1:1:3:3:-tertramethylbutyl) diphenylamine, phenyl-alpha-napthylamine and phenyl-beta-napthylamine.

Preferred aromatic amines include diphenylamine and phenyl-alpha-naphthylamine and their alkylated derivatives.

Hindered alcohols useful in the invention have the following general formulae

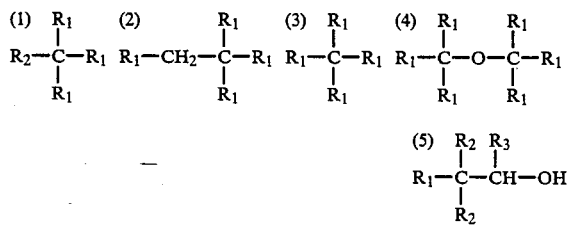

where $R_1$ and $R_2$ are each separately —CHOH, $CH_2OH$ or $CH_3$ and $R_3$ is hydrogen or alkyl of at least about 4 to 22 carbon atoms, preferably about 5.

Preferred hindered alcohols include pentaerythritol, trimethylolpropane, dipentaerythritol, trimethylol ethane, trimethyl-1,3-pentaediol, neopentyl glycol and trimethylolbutane.

The reactants, i.e., the succinic compound, the aromatic amine and the hindered alcohol can be made by any method known to the art or obtained from suitable commercial sources.

The reactions by which the products in accordance with the invention are obtained can, broadly, be carried out over a wide range of conditions of from about 50° C. to about 300° C. in from about 0.5 hour to about 10 hours, depending on temperature and reactivity of the reactants, and at atmospheric or elevated pressures. The temperature preferably is from about 100° C. to about 200° C. for the reaction between the alkenylsuccinic compound and the arylamine. When carrying out the reaction of the alkenylsuccinic-arylamine product and the hindered alcohol, the temperature will generally be from about 100° C. to about 300° C., preferably about 125° C. to about 275° C. and reaction times will run from about 1 hour or less to about 10 hours. The reactants are in the range of about 0.1 to about 1.0 mole of arylamine per 1.0 mole of alkenylsuccinic compound to about 0.5 to 1 mole of hindered alcohol. The preferred amounts of reactants are 1.0 mole of alkenylsuccinic compound, 1.0 mole of arylamine and about 0.75 mole of hindered alcohol.

The alkenyl group of the alkenylsuccinic compound, preferably the anhydride or the acid, substituted or unsubstituted, can have a number average molecular weight of from about 360 to about 1800, i.e., it will preferably have from about 30 to 150 carbon atoms.

The reaction is generally carried out by first reacting the alkenylsuccinic compound and the aromatic amine followed by reacting the product thereof with the hindered alcohol. However any convenient method known to the art may be used.

The products of the invention are used in minor dispersant or anticorrosion amounts with a major proportion of a lubricating oil or grease or other solid lubricant or fuel. In general, this will amount to from about 0.05% to about 15% by weight of the total composition. Furthermore, other additives, such as other detergents, antioxidants, antiwear agents and the like may be compatibly used therein for their known purposes. These additives can include phenates, sulfonates, succinimides, zinc dithiophosphates, polymers, calcium and magnesium salts and the like.

The lubricants contemplated for use with the products herein disclosed include mineral and synthetic oils of lubricating viscosity, mixtures of mineral oils, mixtures of synthetic oils and mixtures of mineral and synthetic oils. The synthetic hydrocarbon oils include long-chain alkanes such as cetanes and olefin polymers such as oligomers of hexene, octene, decene, and dodecene, etc. The products of this invention are especially effective in synthetic oils formulated using mixtures of synthetic hydrocarbon olefin oligomers and lesser amounts of hydrocarbyl carboxylic ester fluids. Other synthetic oils, which can be mixed with a mineral or synthetic hydrocarbon oil, include (1) fully esterified ester oils, with no free hydroxyls, such as pentaerythritol esters of monocarboxylic acids having 2 to about 20 carbon atoms, trimethylolpropane esters of monocarboxylic acids having 2 to about 20 carbon atoms, (2) polyacetals and (3) siloxane fluids. Especially useful among the synthetic esters are those made from polycarboxylic acids and monohydric alcohols. More preferred are the ester fluids made by fully esterifying pentaerythritol, di- and tripentaerythritol or mixtures thereof with an aliphatic monocarboxylic acid containing from 1 to about 20 carbon atoms, or mixtures of such acids.

As hereinbefore indicated, the aforementioned additives can be incorporated into grease compositions. When high temperature stability is not a requirement of the finished grease, mineral oils having a viscosity of at least 40 SSU at 150° F. are useful. Otherwise those falling within the range of from about 60 SSU to about 6,000 SSU at 100° F. may be employed. The lubricating compositions of the present invention, containing the above-described additives, are combined with a grease-forming quantity of a thickening agent. For this purpose, a wide variety of materials can be dispersed in the lubricating oil in such degree as to impart to the resulting grease composition the desired consistency. For example, soap thickeners, e.g., calcium and lithium soaps may be used. Non-soap thickeners, such as surface-modified clays and silicas, aryl ureas, calcium complexes and similar materials may also be used. In general, grease thickeners are employed which do not melt or dissolve when used at the required temperature within a particular environment, however, in all other respects, any material which is normally employed in thickening or gelling oleaginous fluids or forming greases may be used in the present invention.

These additives as mentioned hereinabove are also contemplated for use in liquid hydrocarbyl fuels such as various distillates, diesel fuel and gasoline.

Having described the invention with reference to its broader aspects, the following are offered to specifically illustrate it. It will be understood that the Examples are for illustration only and are not intended to limit the scope of the invention.

EXAMPLE 1

A mixture of 1800 grams (1.0 mol) polybutenylsuccinic anhydride and 169 g (1.0 mol) diphenylamine was stirred at about 170° C. for three hours. After cooling to about 120° C., 105 g (0.7 mol) of commercial pentaerythritol (a mixture of mono- and dipentaerythritol) were added to the mixture and stirred at about 250° C. over a six hour period. The final product was obtained by blowing with nitrogen and filtering.

EXAMPLE 2

A mixture of 1800 grams (1.0 mol) polybutenylsuccinic anhydride and 169 g (1.0 mol) diphenylamine was stirred at about 170° C. for three hours. After cooling to 125° C., 100.5 g (0.75 mol) trimethylolpropane were added and the mixture stirred to 250° C. over a six hour period. The final product was obtained by blowing with nitrogen and filtering.

EXAMPLE 3

A polybutenylsuccinimide commercial dispersant.

EXAMPLE 4

A commercial dispersant derived from polybutenylsuccinic anhydride, pentaerythritol, and a polyethylene polyamine.

EVALUATION OF PRODUCTS

The products of this invention were tested in lubricating oils in the 1-G Caterpillar engine test, the conditions of which were as follows:

An oil composition consisting of a blend of solvent refined mineral oils (KV at 210° F. of 11 cs) was used as the base fluid. To equal amounts of this 4.2% by weight (pure basis) of Examples 1 through 6 were added.

The test engine was a single cylinder 4-cycle Caterpillar engine operated under the following conditions:

| Speed, RPM | 1000 |
|---|---|
| Brake Load, HP | 19.8 |
| Oil Temperature, °F. | 150 |
| Jacket Temperature, °F. | 150 |
| Fuel | Diesel fuel containing 1 percent sulfur |

The engine is operated for 480 hours, ratings being made after 240 hours and 480 hours. These ratings are made in accordance with the Coordinating Research Council (CRC) rating system for diesel pistons. With this system 0 is clean and the maximum piston density allowed is 17,450.

All percentages were by weight. The following results were obtained:

TABLE

| | | Caterpillar 1-G Test | |
|---|---|---|---|
| Example No. | Conc. Wt. % | Top Groove Packing | Weighted Total Demerits |
| 1 | 4.2 | 9.0 | 211.0 |
| 2 | 4.2 | 35.0 | 270.0 |
| 3 | 4.2 | 120.0 | 360.0 |
| 4 | 4.2 | 35.0 | 250.0 |

The test procedure is described in U.S. Pat. No. 4,292,186. The base oil composition comprised a blend of solvent refined material oils which also contained minor amounts of overbased calcium sulfonate, overbased calcium phenate, normal calcium sulfonate, zinc dithiophosphate and a hindered phenol antioxidant.

The test results clearly show the excellent dispersant properties of additive products prepared in accordance with the invention.

We claim:

1. A fuel composition comprising a major proportion of a liquid hydrocarbon fuel and a minor effective dispersant or antioxidant amount of a product of reaction made by
   (a) reacting a polyalkenylsuccinic compound selected from the group consisting of an alkenyl succinic acid and the ester and the anhydride thereof, with an aromatic amine of the formula:

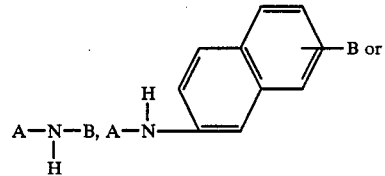

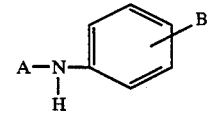

wherein A and B may be the same or a different aromatic group and where one or both of said aromatic groups contain an alkyl substituent having from about 4 to about 18 carbon atoms; and wherein said aromatic groups have from 6 to about 50 carbon atoms; and thereafter with
(b) a hindered alcohol selected from the group having the following general formulae:

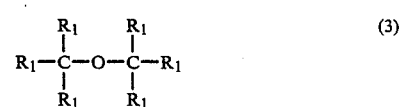

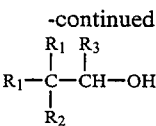

wherein $R_1$ and $R_2$ are each separately selected from $CH_2OH$ and $CH_3$ with the proviso that at least one of $R_1$ or $R_2$ is $CH_2OH$ and $R_3$ is selected from hydrogen or alkyl of from about 4 to about 22 carbon atoms and wherein reaction (a) is carried out at temperatures of from about 100° to about 200° C. and reaction (b) is carried out at temperatures of from about 100° to about 300° C. with the reactants being present in a molar ratio of succinic compound to aromatic amine to hindered alcohol of about 1:0.1–1:0.5–0.75.

2. The composition of claim 1 wherein the molar ratio of succinic compound to amine to alcohol is from about 1:1:0.75.

3. The composition of claim 1 wherein the alkenyl portion of the alkenylsuccinic compound has from about 30 to about 150 carbon atoms.

4. The composition of claim 1 wherein the amine is diphenylamine.

5. The composition of claim 1 wherein the hindered alcohol is a pentaerythritol.

6. The composition of claim 1 wherein the hindered alcohol is trimethylolpropane.

7. The composition of claim 1 wherein the succinic compound has a number average molecular weight of from about 360 to 1800 and is selected from an alkenylsuccinic acid or anhydride thereof.

8. The composition of claim 7 wherein the succinic compound is polybutenylsuccinicanhydride, the amine is diphenylamine and the hindered alcohol is trimethylolpropane.

9. The composition of claim 7 wherein the succinic compound is polybutenylsuccinicanhydride, the amine is diphenylamine and the hindered alcohol is pentaerythritol.

10. The composition of claim 1 wherein said fuel is a distillate fuel.

11. The composition of claim 1 wherein said fuel, is a diesel fuel.

12. The composition of claim 1 wherein said fuel is a gasoline.

* * * * *